Feb. 19, 1957 R. A. GOEPFRICH 2,781,873
BRAKE DRUM
Filed June 17, 1953 2 Sheets-Sheet 1

INVENTOR.
RUDOLPH A. GOEPFRICH
BY Cecil J Arera
ATTORNEY

United States Patent Office 2,781,873
Patented Feb. 19, 1957

2,781,873
BRAKE DRUM

Rudolph A. Goepfrich, South Bend, Ind., assignor to Bendix Aviation Corporation, South Bend, Ind., a corporation of Delaware Application June 17, 1953, Serial No. 362,247

3 Claims. (Cl. 188—264)

This invention relates to brake drums and more particularly to a drum constructed for use in heavy duty applications.

One of the serious deficiencies of prior art heavy duty braking devices is that the brake drum tends to bell-mouth under the influence of the brake applying forces. This condition, of bell-mouthing is a situation wherein there is produced diametral deflection of the open end of the drum-ring and as this occurs the general shape of the drum-ring changes from that of a cylinder to a somewhat frusto-conical shape.

This tendency to bell-mouth becomes more noticeable with wider drum-rings since a given angle of deflection produces more marked results when acting through a greater length. Also, with the wider drum-rings there is a greater tendency to bell-mouth since the drum-ring is attached on one side only and the applying force of the shoe against the drum-ring has a larger lever arm through which it can operate to deflect the unattached side of the drum-ring. Bell-mouthing is undesirable because, first, it causes pedal travel loss, second, it results in unevenness of wear of the brake lining, and third, adjustment of the brake shoes within satisfactory limits is not possible with uneven wear of the brake lining. It is this problem of bell-mouthing which the present invention proposes to eliminate and thereby to prevent any of the undesirable results which stem from bell-mouthing.

The present brake drum construction may be generally adapted for use on any preferred internal expanding brake. It is illustrated with the present specific internally expanding brake for illustrative purposes only.

It is the primary object of the present invention to eliminate bell-mouthing of the drum-ring, that is unequal diametral deflection of the open end of the drum-ring under the influence of a brake application.

It is another object of the invention to secure lower operating temperatures of the brake by providing extensive circulation of air as a coolant through the unit.

A still further object of the invention is to provide an easily assembled brake drum, capable of withstanding high torque loads without appreciable distortion of the component parts.

The above and other objects and features of the invention will appear more fully hereinafter from a consideration of the following description, taken in connection with the accompanying drawings wherein two embodiments of the invention are illustrated by way of example.

Figure 1:
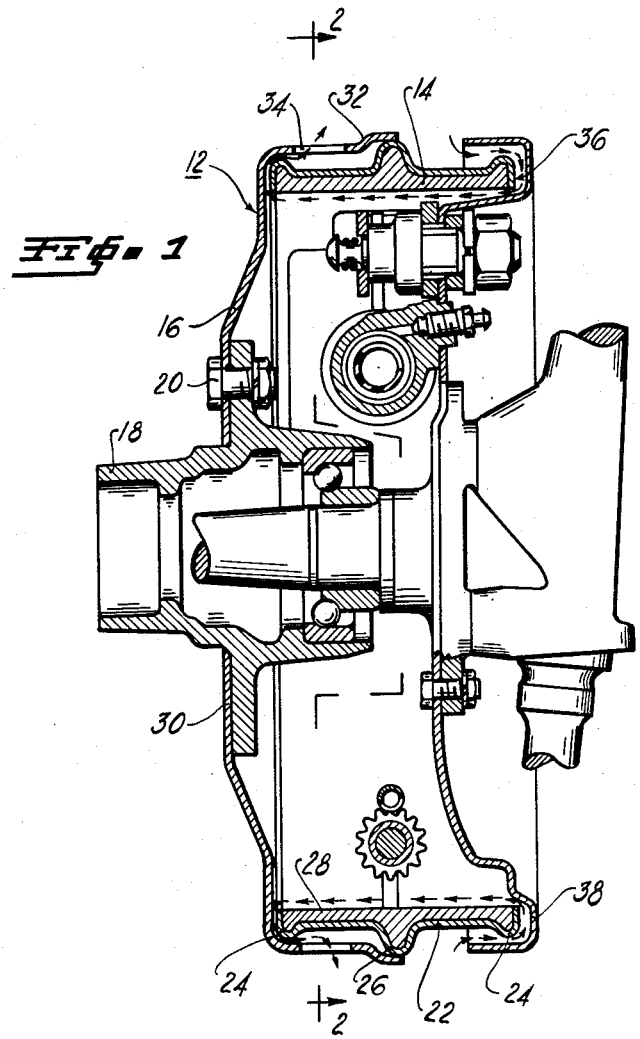
Figure 1 is an axial section taken through the middle of the brake assembly.

A brake drum designated generally by reference numeral 12 includes a drum-ring 14 which is suitably secured to a drum-back 16 which in turn is fastened to a rotatable member such as wheel hub 18 by a plurality of fastening members 20.

The drum-ring 14 consists of a sheet metal stamping or shell 22 provided with annular ribs 24 at each of the remote ends of the drum-ring 14. The purpose of these ribs is to strengthen the drum-ring 14 against diametral deflection of either of the ends in a manner which will become clearer hereinafter. A third strengthening rib 26 is disposed substantially midway between the remote ends of the drum-ring 14. The drum-ring 14 is lined with any suitable metal such as iron. This lining may be cast in the form shown by any of the well known methods, such for example, as by a centrifugal casting process so that the inner surface 28 is a relatively smooth continuous surface adapted for engagement with a non-rotatable friction element such as a pair of arcuate shoes 29 and 31.

The drum-back 16 consists of a disc-like base portion 30 joined by a substantially cylindrical transverse flange 32. The flange 32 envelops a portion of the drum-ring 14 and lies contiguous to the external surface of the drum-ring so that the flange 32 rides against the rib 26 where a continuous weld is formed to join the drum-back 16 and drum-ring 14 together.

The flange 32 is further provided with a plurality of circumferentially spaced openings 34 which serve as outlets for circulating air which passes across the friction element engaging surface 28 of the drum-ring 14 in the manner and direction illustrated in Figure 1. It will be noted that the drum-ring 14 is suspended from the base 30 of the drum-back 16 so that the rib 24 is not in contact with the flange 32 to allow for the circulation of air in the manner before described.

It is an important part of the present invention that the connection of the drum-back 16 to the drum-ring 14 is located substantially midway between the open ends of the drum ring 14. The effect of this type of connection is that when the friction producing unit, such as the pair of arcuate shoes 29, 31, engages the inner surface 28 of the drum-ring 14 the resultant force of their application will be along a line and in a plane which is coplanar with the attachment point of the flange 32 and rib 26; the result is that just as much of the brake applying force is dissipated on one-half axial section of the drum-ring as on the other half and the resultant of the brake applying force is coplanar with the reaction provided at the juncture of the drum-back flange 16 and the rib 26. since the resultant of the brake applying force acts through the juncture point of the drum-back 30 and drum-ring 14, there is no lever arm through which this resultant force of application can act to produce diametral distortion of either of the open ends of the drum-ring 14. That is, the effect of the brake applying force of the shoes on the drum may be considered as concentrated in a single plane through the juncture point of the drum-back 30 and drum-ring 14.

It is a further result of the novel drum construction that if any diametral deflection occurs in either of the open ends of the drum-ring, it will be substantially equal because equal applying effort of the shoes on the drum is exerted on either side of the juncture of the drum-back and drum-ring. This is an important consideration since the arcuate shoes 29, 31 are free to follow the drum and instead of "cocking" to follow the configuration of a bell-mouthed drum, the shoes will remain substantially centralized throughout the braking cycle and consequently will wear more evenly. As a result accurate adjustment of the shoes can be made which could not otherwise be obtained with a tapered wear on the brake shoe lining which stems from braking a bell-mouthed drum.

Another significant improvement of the present invention has to do with the end of the drum 36 in relation to the dust cover 38.

Referring to Figure 1, it will be seen that some clearance between the open end of the drum-ring 14 and the dust cover 38 must be established to allow for any diametral increase of the drum-ring 14. This provision for clearance between drum-ring 14 and dust cover 38 necessarily results in a looser fitting of the two members when bell-mounting is pronounced and consequently the interior of the brake then becomes more susceptible to contamination from water, dust and other foreign material. Hence, the problem of bell-mouthing is also related to the sealing of the brake from deteriorating agents. But the present invention, solving the problem as it does by the substantial elimination of bell-mouthing, enables a smaller clearance in the fit between the end 36 of the drum-ring 14 and the dust cover 38, and since the fit between these two members is held to a smaller clearance this results in greater protection for the brake unit.

Figure 3:
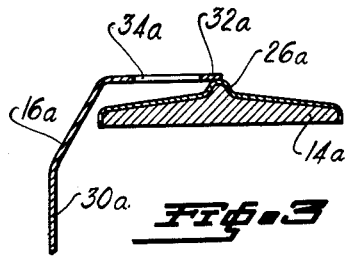
Figure 3 is a fragmental section of a modification of the drum-ring and type of connection between the drum components.
Figure 4:
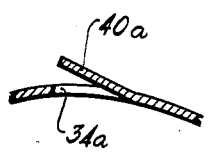
Figure 4 illustrates one of the cooling vents provided with a louver as a modification of the vent of Figure 3.
Figure 2:
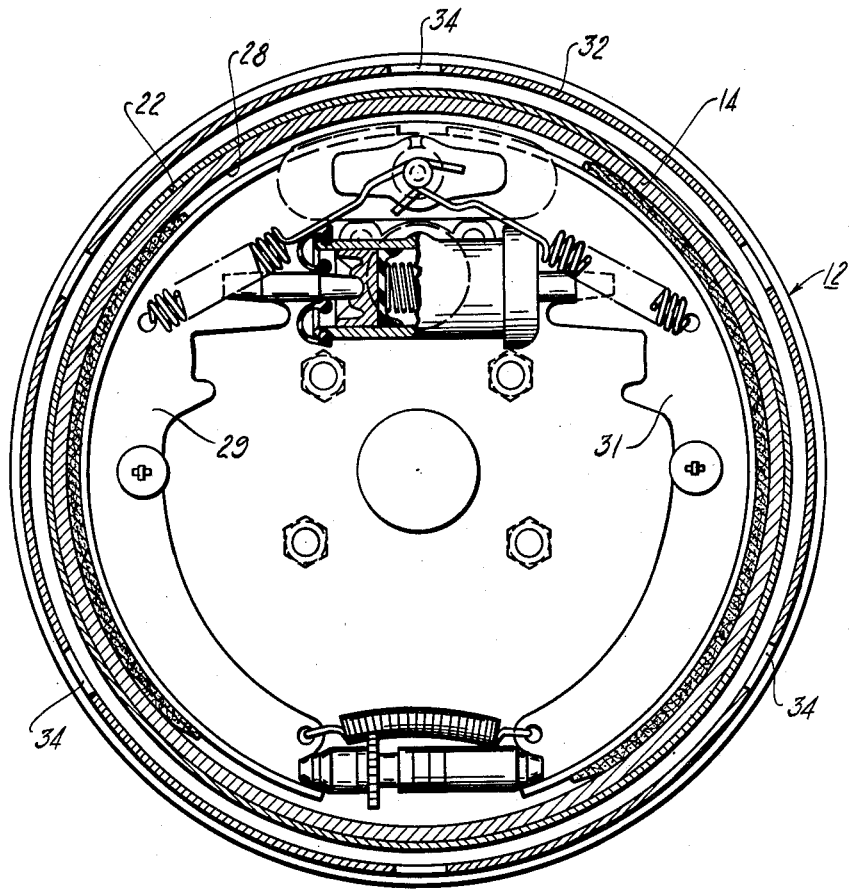
Figure 2 is a section taken on line 2—2 of Figure 1.

In the modification illustrated in Figure 3 the drum-ring 14a is shown with a single rib 26a. This type of drum-ring may be used in combination with narrower brake shoes since the problem of drum distortion is less pronounced with the smaller brakes and there is less need therefore, for annular ribs at the mouth of the drum-ring as shown in Figure 1. This type of drum-ring 14a has the advantage of providing increased clearance between the drum-ring 14a and the base portion 30a of the drum-back 16a. This increased clearance is conducive to more efficient circulation of air around the drum-ring 14a and through openings 34a, circumferentially spaced about flange 32a. For some purposes, the openings 34a may be provided with louvers 40a as shown in Figure 4 which, in one direction of rotation of the drum, will produce an even faster and more efficient forced circulation of air through the brake unit.

In operation, the arcuate shoes 29 and 31 are actuated into engagement with the inner surface 28 of the drum-ring 14, contacting this surface along the entire circumference of the drum-ring 14. The resultant force of application of the shoes will lie substantially midway between the two ends of the drum-ring 14. Normally, this resultant force would, if acting on a drum-ring which was attached at one end only of the drum-ring, cause a deflection of the open end of the drum. However, in the instant case, with reference to Figure 1, it will be seen that the resultant force of application of the shoes is coincident with the juncture of the drum back flange 32 and reinforcing rib 26. There is, therefore, no lever arm through which the resultant of the applying force acts to produce deflection of either of the open ends of the drum-ring, and the brake shoes instead of cocking out of operative position to follow a distorted, bell-mouthed drum will remain in the same applied position throughout the braking cycle.

On further examination of conditions during the course of braking it will be apparent that any deflection of either of the open ends of the drum will be equal since the applying force of the shoes against the drum is distributed approximately equally on either side of the reinforcing rib 26. This deflection of either of the open ends of the drum is maintained at a mimimum by peripherally located ribs 24, but inasmuch as any deflection of the ends of the drum is substantially equal, the undesirable effects of bell-mouthing are substantially eliminated. Upon release of the brake, distortion of either of the ends of the drum-ring will be overcome by the natural resiliency of the drum-ring 14 which will cause it to resume its original shape as illustrated.

Although only 4 embodiments of the invention have been illustrated it will be obvious to those skilled in the art that various changes in size and degree may be effected without departing from the underlying principles of the invention.

I claim:

1. For use in cooperation with a friction-producing element, a rotatable drum comprising a substantially cylindrical drum-ring including a sheet metal shell having metallic lining formed therein to provide a continuous relatively smooth inner surface adapted for engagement with a friction-producing element, an annular rib at each of the open ends of said shell, a third annular rib located on the outer surface of said shell substantially midway between the open ends thereof, a drum-back, a plurality of fastening members for securing said drum-back to a rotatable member, a substantially cylindrical transverse flange located at the periphery of said drum-back, said transverse flange extending contiguously to said drum-ring and contacting said third rib of the drum-ring whereby said drum-ring and drum-back may be secured together, said transverse flange having a plurality of circumferentially spaced openings arranged for expelling air from the cavity formed between said transverse flange and drum-ring, said drum-ring being spaced from the base of said drum-back to provide an annular passage to said cavity thereby permitting complete circulation of air into the brake and exit from said openings and a plurality of louvers formed in said transverse flange serving as air scoops to forcibly pump air through the braking system.

2. For use in combination with a friction-producing element, a rotatable brake drum comprising a substantially cylindrical drum-ring including a sheet metal stamping shaped to form a cylindrical shell having metallic lining therein to provide a continuous, relatively smooth inner surface adapted for engagement with said friction-producing element, an annular rib at each of the open ends of said stamping, a third annular rib on the outer surface of said stamping situated substantially midway between said other ribs, a drum-back having a base portion secured to a rotatable member, a cylindrical flange transverse said base portion and enveloping a portion of said drum-ring so that the flange is in contact with said third rib and secured thereto in such a manner that engagement of said friction-producing element with the inner surface of said drum-ring will be resisted by a coplanar reaction tending to prevent distortion of the substantially cylindrical shape of said drum-ring during the brake application, and a plurality of air scooping elements circumferentially spaced in said transverse flange for providing forced air circulation across the surface of the drum-ring engageable with said friction-producing element.

3. For use in connection with a non-rotatable radially-expanding friction unit, a rotatable drum comprising a substantially cylindrical drum-ring having a friction-unit engaging inner surface and an outer surface provided with reinforcing ribs located at each of the remote ends thereof, a rib in the outer surface of said drum-ring intermediate the remote ends thereof, a drum-back provided with a transverse axially-extending flange contacting said last mentioned rib and connected thereto in such a manner that the force of engagement of the radially-expanding unit with the inner surface of the drum-ring will be transmitted through said last mentioned rib directly to said drum-back thereby tending to reduce distortion of the cylindrical shape of said drum-ring, and a plurality of circumferentially spaced struck-up portions formed in said axially-extending flange of said drum-back, said struck-up portions serving as air scoops producing forced circulation of air across the friction unit engaging inner surface of said cylindrical drum ring and throughout the brake.

References Cited in the file of this patent

UNITED STATES PATENTS

| | | |
|---|---|---|
| 1,881,002 | Udale | Oct. 4, 1932 |
| 1,925,598 | Nelson | Sept. 5, 1933 |
| 1,990,746 | Nelson | Feb. 12, 1935 |
| 2,174,611 | Ash | Oct. 3, 1939 |
| 2,181,008 | Bonzack | Nov. 21, 1939 |
| 2,493,173 | Van Halteren | Jan. 3, 1950 |